United States Patent [19]
Chen

[11] Patent Number: 5,615,577
[45] Date of Patent: Apr. 1, 1997

[54] ULTRATHIN TRANSMISSION MECHANISM FOR ALL TYPES OF AUTOMOBILE POWER WINDOW

[76] Inventor: Tse-Hsing Chen, No. 22, Lane 351, Di Hwa Street, Taipei, Taiwan

[21] Appl. No.: 661,693

[22] Filed: Jun. 11, 1996

Related U.S. Application Data

[63] Continuation of Ser. No. 289,251, Aug. 11, 1994, abandoned.

[51] Int. Cl.$^6$ .................... E05F 11/48; F16C 1/20
[52] U.S. Cl. .................. 74/89.21; 49/349; 49/352; 74/502.3; 59/2; 474/203
[58] Field of Search .............. 74/89.21, 502.3; 49/349, 352; 59/2; 474/203

[56] References Cited

U.S. PATENT DOCUMENTS

| | | | |
|---|---|---|---|
| 3,204,480 | 9/1965 | Bradbury | 74/502.3 X |
| 3,540,301 | 11/1970 | Bartz | 474/203 X |
| 4,445,604 | 4/1984 | Rogers | 74/89.21 |
| 4,503,722 | 3/1985 | Suzuki et al. | 74/89.21 |
| 4,592,245 | 6/1986 | Pickles | 74/89.21 |
| 4,656,780 | 4/1987 | Miyauchi et al. | 74/502.3 X |
| 4,767,386 | 8/1988 | Spaggiari | 474/148 |
| 4,842,233 | 6/1989 | Rusin | 74/89.21 X |
| 4,865,516 | 9/1989 | Focke et al. | 74/89.21 X |
| 4,962,847 | 10/1990 | Pisors et al. | 474/154 X |
| 5,006,097 | 4/1991 | Cook | 474/154 |
| 5,140,760 | 8/1992 | Mannbro | 74/89.21 X |

FOREIGN PATENT DOCUMENTS

| | | | |
|---|---|---|---|
| 0160923 | 11/1985 | European Pat. Off. | 74/89.21 |
| 248455 | 12/1987 | European Pat. Off. | 74/502.3 |
| 935067 | 1/1948 | France | 474/203 |
| 3309289 | 9/1984 | Germany | 49/352 |
| 56-83635 | 7/1981 | Japan | 474/204 |
| 2251047 | 6/1992 | United Kingdom | 74/89.21 |

*Primary Examiner*—Allan D. Herrmann
*Attorney, Agent, or Firm*—Bacon & Thomas

[57] ABSTRACT

An ultrathin transmission mechanism for all types of automobile power windows is provided, in which the gears thereof each is formed at its shaft hole periphery with two laterally outward projected flanges for positioning the gears on the transmission mechanism with reduced overall width or thickness required for mounting the transmission mechanism. A transmission chain thereof is partially coated at its cord segments exposed between every two ball-type teeth with a layer of material the same as that used to make the ball-type teeth, thereby preventing the transmission chain from becoming extended even after a long term period of use and to always provide high-precision displacement.

3 Claims, 6 Drawing Sheets

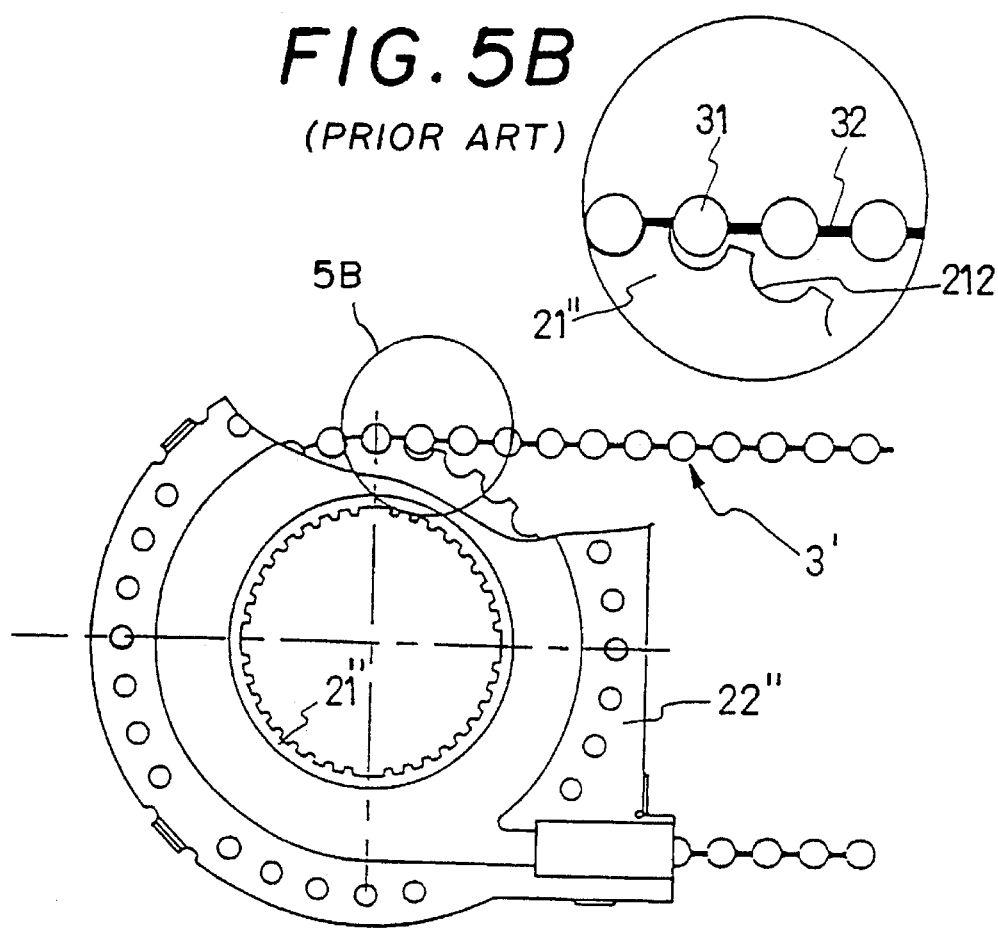
FIG. 5B
(PRIOR ART)
FIG. 5A
(PRIOR ART)
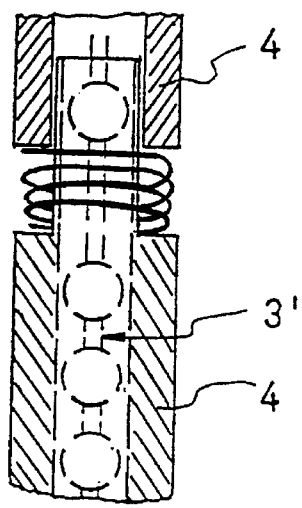
FIG. 6
(PRIOR ART)

ULTRATHIN TRANSMISSION MECHANISM FOR ALL TYPES OF AUTOMOBILE POWER WINDOW

This application is a continuation of application Ser. No. 08/289,251, filed Aug. 11, 1994, now abandoned.

BACKGROUND OF THE INVENTION

The present invention relates to a generalized ultrathin transmission mechanism for all types of automobile power windows, in which the gears thereof each is formed with a shaft hole having two laterally outward projected flanges for its positioning on the transmission mechanism and thereby reduces the overall width or thickness required for the gear assembly. The present invention relates more particularly to a generalized ultrathin transmission mechanism for all types of automobile power windows, in which the transmission chain thereof is partially coated and thereby penetrated at its cord segments exposed between every two ball-type teeth with a layer of material the same as that used to make the ball-type teeth, so that the cord will not become extended even after long term period of use.

For all types of automobiles, the doors thereof each has only limited intermediate space which is particularly narrower at the window handle portion where an inside steel plate and an outside door decorative panel are mounted. Under this situation, it is very difficult for the general type power window mechanism having considerable thickness to be additionally mounted on the existing window handle mechanism inside the door. Visually unpleasant protrusions will be found on the door decorative panels if the general type power window mechanism is improperly mounted without considering the limited intermediate space available from the doors. Moreover, the transmission chain in the automobile power window mechanism for transferring power usually consists of a steel cord and a plurality of ball-type teeth sequentially arranged on the steel cord. Please refer to FIGS. 5A and 5B in which a conventional transmission chain structure is shown. The cord between every two ball-type will inevitably become loose and extend after long term period of use and thereby increases the interval between every two teeth which will have reverse influence on the precise driving of the gear. Additional springs are used to overcome such undesirable extension of cord. FIG. 6 shows an example of such solutions. However, the adding of a spring between every two teeth may be useful for the minor extension of cord, it fails to completely solve the problem when the extension of cord becomes more and more serious after long term period of use. It is therefore desirable to have some way to improve the above mentioned shortcomings present in the conventional automobile power window transmission mechanism to achieve better efficiency of use.

SUMMARY OF THE INVENTION

It is therefore a primary object of the present invention to provide an automobile power window transmission mechanism in which a driven gear thereof is formed with a shaft hole having two laterally outward projected flanges to facilitate the positioning of the gear on the transmission mechanism, and thereby reduces the thickness required by the gear assembly in the transmission mechanism. A power window transmission mechanism with reduced thickness is, of course, more convenient for mounting in all types of automobiles.

Another object of the present invention is to provide an automobile power window transmission mechanism in which each steel cord segment of the transmission chain of the mechanism between every two ball-type teeth is coated and penetrated with a layer of material the same as that used to make the ball-type teeth, so that the steel cord of the transmission chain will not become extended and loose after long term period of use.

BRIEF DESCRIPTION OF THE INVENTION

The structure, features, and other objects of the present invention, as well as the technical means adopted to achieve the present invention can all be best understood through reading the following detailed description of the preferred embodiment and the accompanying drawings, wherein FIG. 1 is a perspective view of the present invention;

FIGS. 5A and 5B illustrate a transmission chain used in the conventional transmission mechanism; and FIG. 6 illustrates the manner in which a spring is added to the steel cord segment between two ball-type teeth to overcome the problem of extended and loose steel cord.

DETAILED DESCRIPTION OF THE PREFERRED EMBODIMENT

Please refer to FIGS. 1 through 4, the generalized ultrathin transmission mechanism for all types of automobile power windows according to the present invention mainly includes a power window mechanism 1, a driven mechanism 2, a transmission chain assembly 3, and a sleeve assembly 4 made from interconnected pipe members such as that shown at 4a and 4b.

Figure 1:
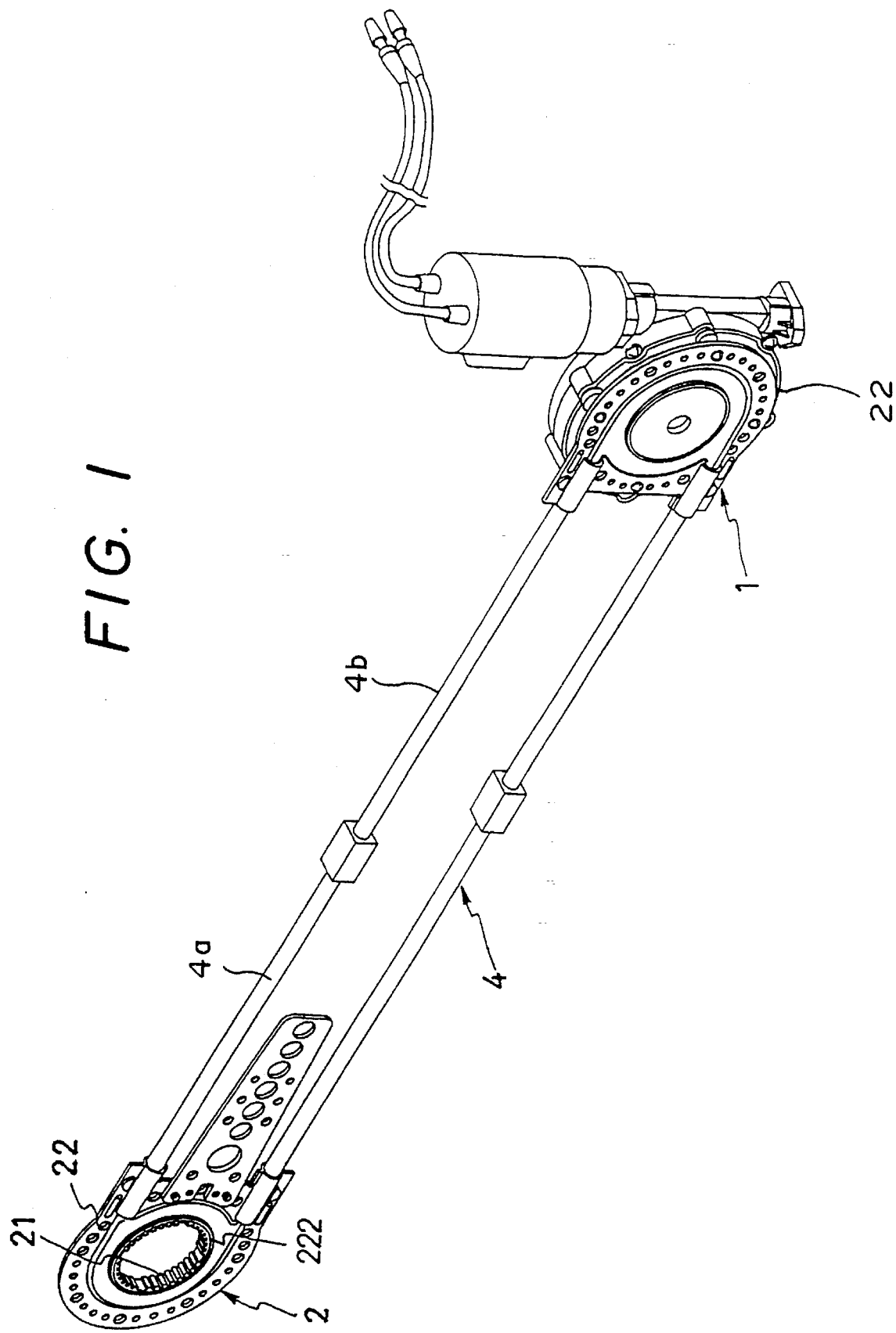
Figure 2:
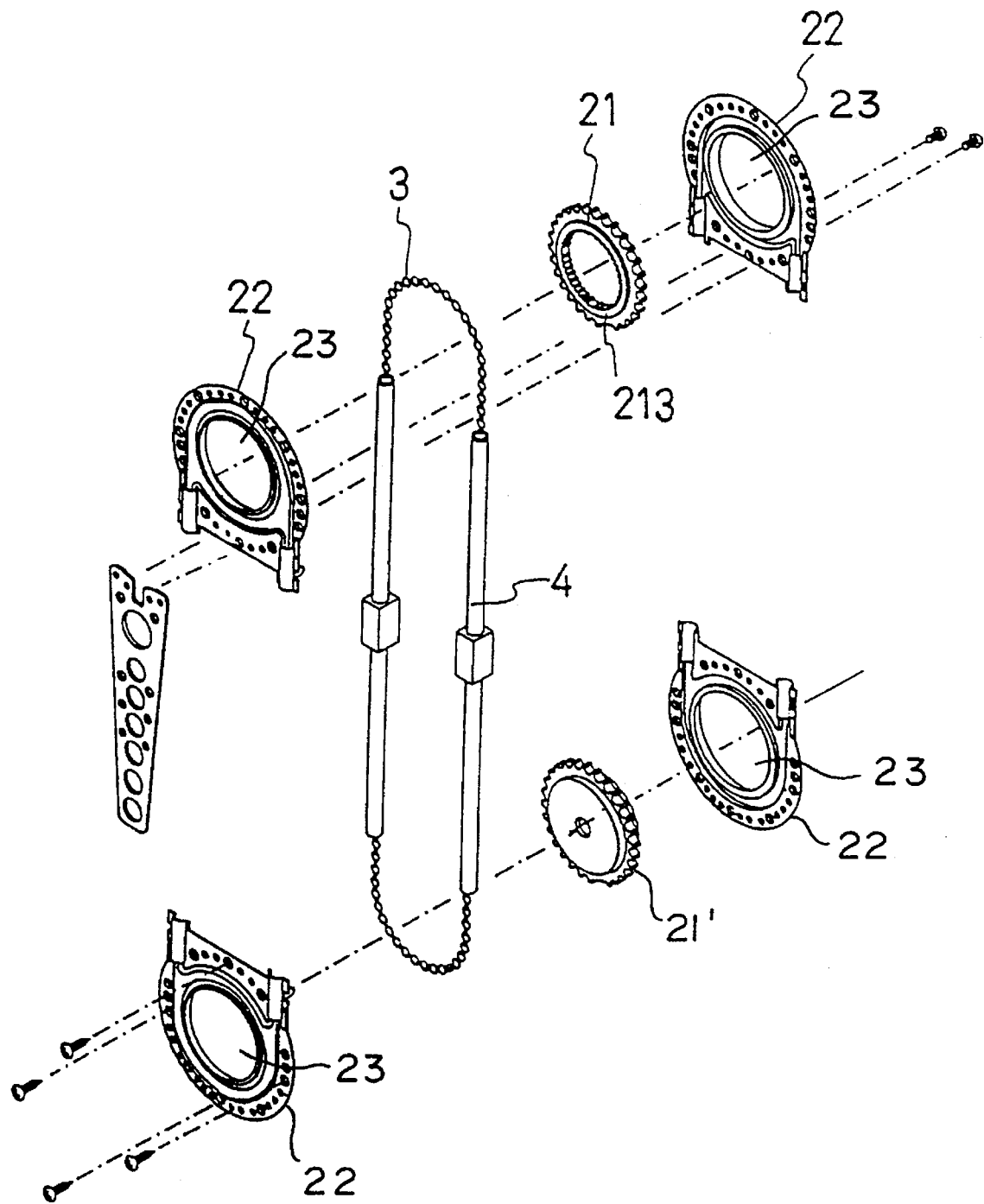
FIG. 2 is a disassembled perspective view of the present invention.
Figure 3A:
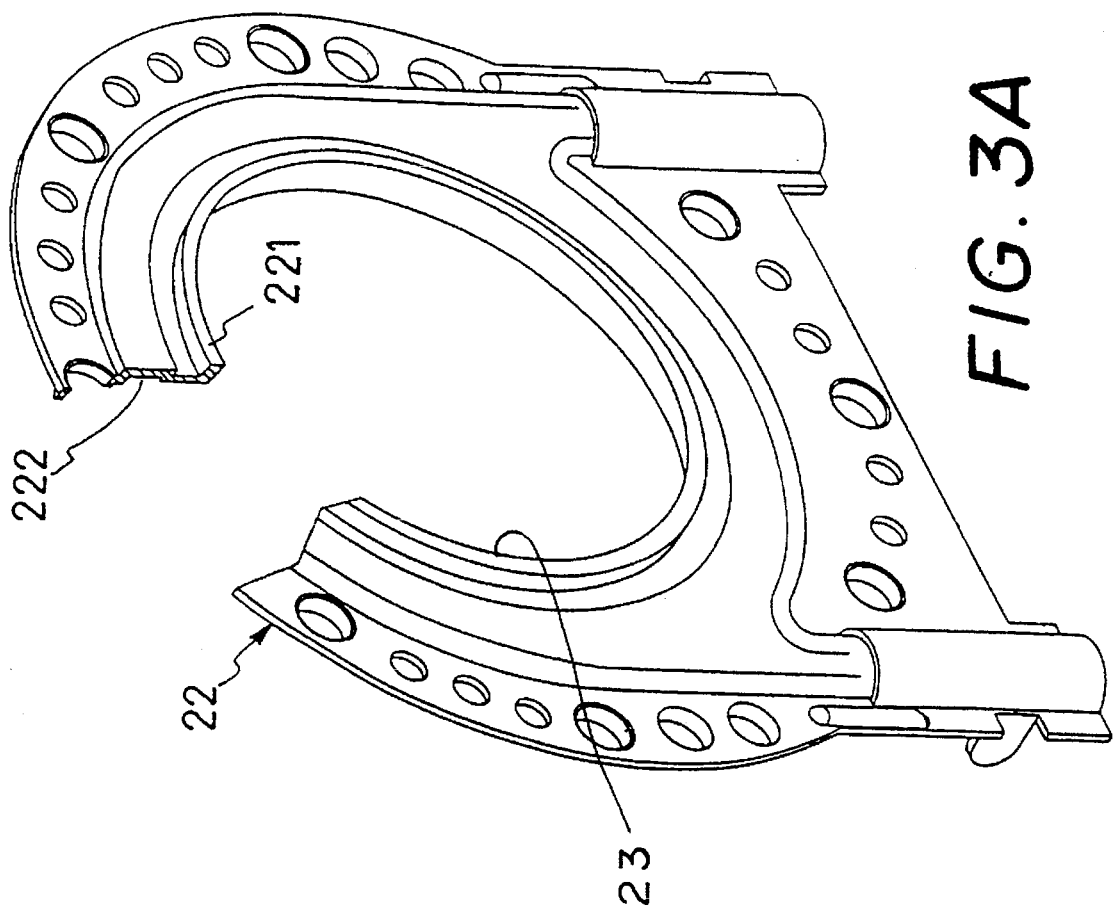
FIGS. 3A and 3B illustrate the perspective views of the driven gear and the protective gear cover according to the present invention, in which a part of these members are removed to better show the cross sections thereof.
Figure 3B:
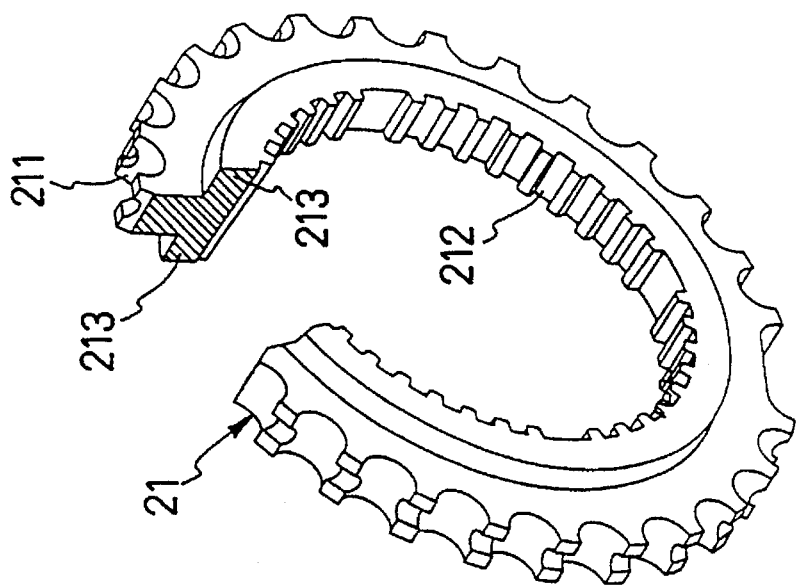
Figures 3C, 3D:
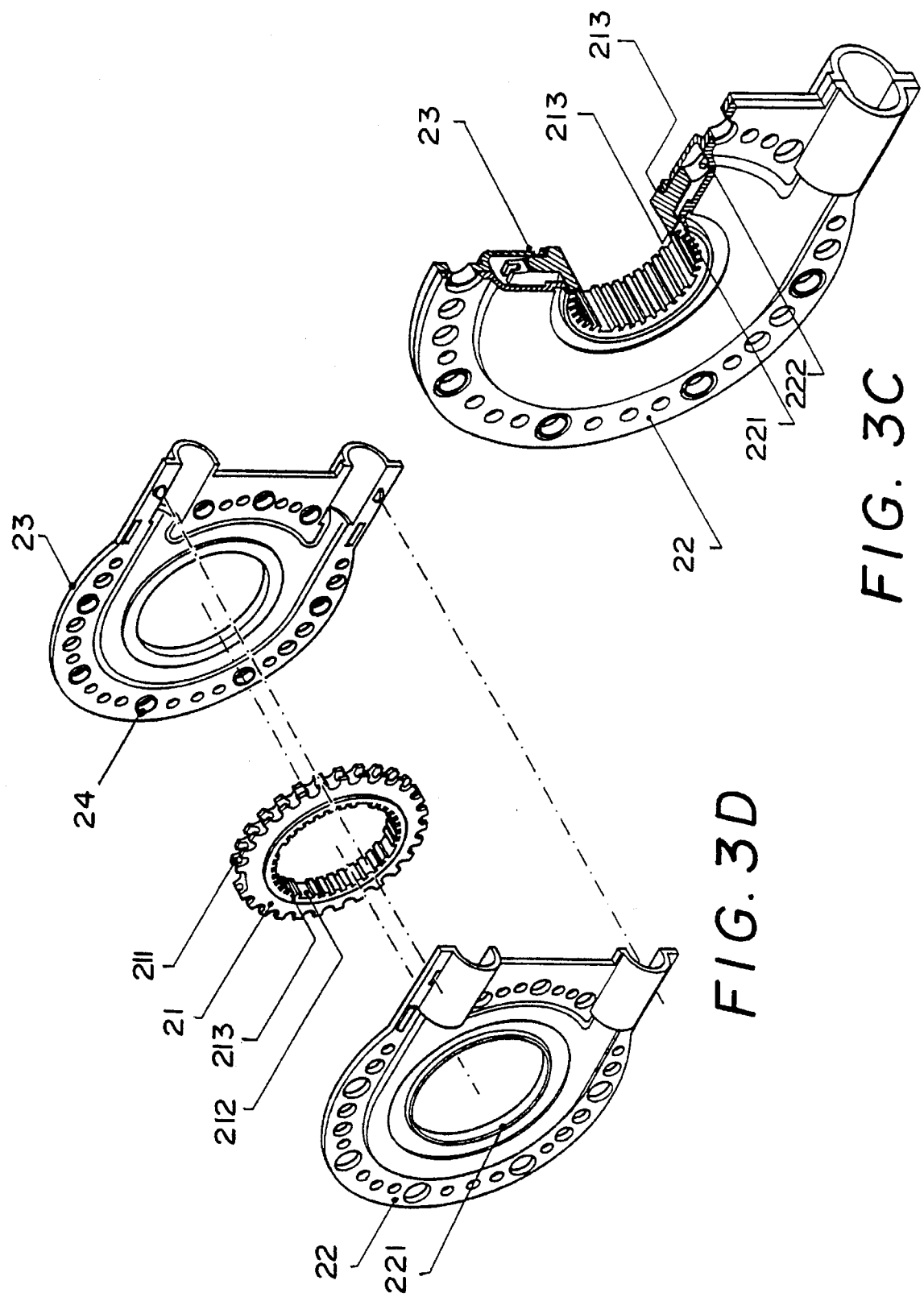
FIG. 3C is an assembled, partial cross-sectional view of the driven gear and protective gear cover.
FIG. 3D is an exploded view of the assembly of FIG. 3C.
Figure 4C:
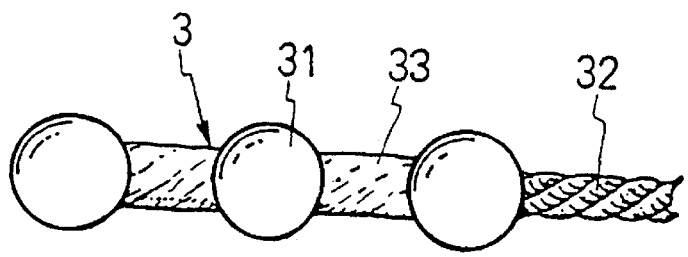
FIGS. 4A, 4B, 4C and 4D illustrate the coated steel cord segments between every two ball-type teeth of the transmission chain.
Figure 4D:
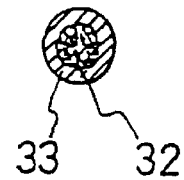
Figure 4B:
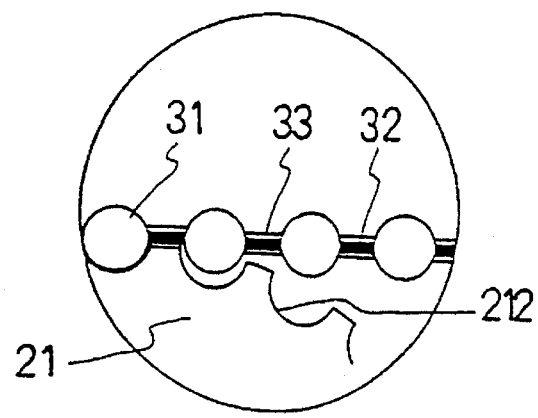
Figure 4A:
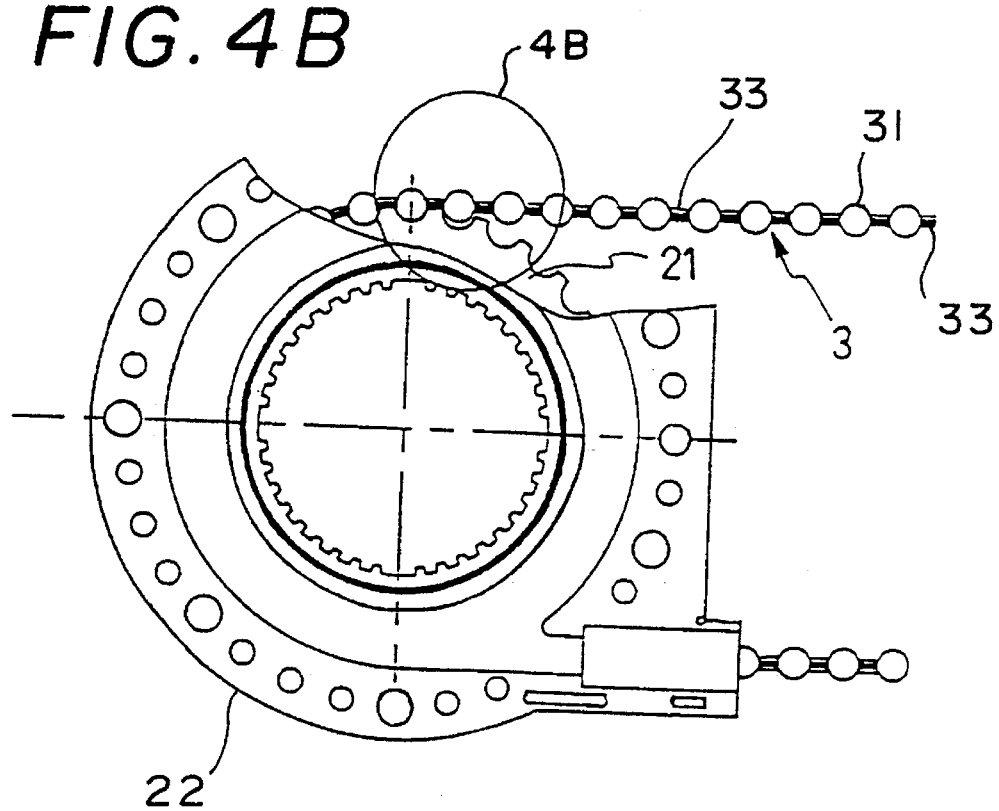

According to the present invention, the improvements therein lie in the specially designed gears and protective gear covers 22 for the power window mechanism 1 and the driven mechanism 2. More particularly, the improvement in the gears lies in the specially designed sectional profile of the gear body, as shown in FIGS. 3A and 3B in which a driven gear 21 and a protective gear cover 22 are illustrated as an example for description purpose in this specification. It can be seen from FIG. 3B that the driven gear 21 has a reverse T-shaped sectional profile. Teeth 211 provided at an outer circumferential periphery of each driven gear 21 have a lower edge which laterally projects and extends outward at two sides to each form a gear guiding flange 213, that is, the bottom transverse portion of the reverse T-shaped sectional profile of the driven gear 21. The protective gear cover 22 each has a central opening 23 of which an inner circular periphery is bent outward, radially inwardly of an annular portion 222 to form a cover guiding flange 221. When the driven gear 21 is clamped between two protective gear covers 22 (see FIGS. 3C and 3D), the gear guiding flanges 213 shall each fitly contact an inner surface of the cover guiding flange 221 of the protective gear covers 22 and be retained within a gear chamber formed by the two protective gear covers 22. A gear can be more conveniently positioned in this manner than in a conventional power window mechanism and this permits the two protective gear covers 22 to require only smaller width of space for mounting the whole power window transmission mechanism without the risk of facing an insufficient mounting space as in the conventional power window transmission mechanism.

Another improvement in the present invention lies in the means it provides to prevent the occurrence of transmission gap. The transmission chain assembly 3 according to the present invention includes of a steel cord 32 and a plurality of ball-type teeth 31 sequentially and adequately spaced on the steel cord 32. Exposed segments of the steel cord 32 between every two ball-type teeth 31 are coated and thereby penetrated with a layer of material 33 which is the same as that used to make the ball-type teeth 31. Please specially refer to FIGS. 4A–4D from which it can be clearly seen that all the clearances among the strands of the steel cord 32 are filled by the penetrated coating layer 33, permitting the steel cord 32 to keep the same length without becoming extended or loose after long term period of use. Moreover, the coating layer 33 also prevents moisture from easily permeating into the steel cord 32 and rusting the same. Thereby, the usable life of the steel cord 32 can be extended and the frictional resistance between the gears and the transmission chain assembly 3 can be reduced.

According to the above arrangements, the overall thickness or width of the power window transmission mechanism can be actually reduced for easier mounting, and the coated steel cord of the power window transmission chain assembly can be effectively prevented from becoming loose and extended after long term period of use.

The present invention has been described in detail with particular reference to the preferred embodiment thereof but it will be understood that variations and modifications can be effected within the spirit and scope of the present invention as described hereinabove and as defined in the appended claims.

What is claimed is:

1. An ultrathin transmission mechanism for automobile power windows comprising:

a power window mechanism adapted to be drivingly coupled to a rotary output member of a motor;

a driven mechanism adapted to be attached to an automobile window driving unit, each of said power window mechanism and said driven mechanism including a gear and two protective gear covers, said gear including a plurality of circumferentially spaced, peripheral teeth having inner radial sides that project laterally outwardly to form a gear guiding flange whereby said gear has a generally reverse T-shaped sectional profile, each of said protective gear covers including a central opening defined by an outwardly extending cover guiding flange, said gear being adapted to be rotatably mounted within said two protective gear covers with said gear guiding flanges contacting said cover guide flanges;

a transmission chain assembly including a cord and a plurality of spaced ball-type teeth extending about the gear of each of said power window mechanism and said driven mechanism; and a sleeve assembly including a plurality of pipe members extending between and interconnecting said power window mechanism and said driven mechanism and housing said chain assembly for sliding movement therein.

2. An ultrathin transmission mechanism for automobile power windows as claimed in claim 1, wherein said cord has exposed segments between every two of said ball-type teeth, said exposed segments of cord being coated and penetrated with a layer of material which is the same as that used to make said ball-type teeth, such that all clearances among strands of said cord are filled by said penetrated coating material, permitting said cord to keep the same length without becoming extended or loose after long term period of use while moisture is prevented from easily permeating into said cord and rusting the same, and thereby, a usable life of said cord is extended and a frictional resistance between said gears and said transmission chain assembly is reduced.

3. A transmission mechanism for automobile power windows comprising:

a power window mechanism adapted to be drivingly coupled to a rotary output member of a motor;

a driven mechanism adapted to be attached to an automobile window driving unit, each of said power window mechanism and said driven mechanism including a gear and two protective gear covers, said gear including a plurality of circumferentially spaced, peripheral teeth having a lower edge which laterally projects and extends outward at two sides to form gear guiding flanges giving said gear a generally reverse T-shaped sectional profile, each of said protective gear covers including an outwardly extending cover guiding flange, wherein said gear guiding flanges fitly contact an inner surface of said cover guide flanges when said gear is clamped between said two protective gear covers;

a transmission chain assembly including a cord and a plurality of spaced ball-type teeth extending about the gear of each of said power window mechanism and said driven mechanism; and a sleeve assembly extending between and interconnecting said power window mechanism and said driven mechanism and housing said chain assembly for sliding movement therein.

\* \* \* \* \*